(12) United States Patent
Jensvold et al.

(10) Patent No.: US 6,641,643 B2
(45) Date of Patent: Nov. 4, 2003

(54) CERAMIC DEOXYGENATION HYBRID SYSTEMS FOR THE PRODUCTION OF OXYGEN AND NITROGEN GASES

(75) Inventors: John A. Jensvold, Benicia, CA (US); Scott S. Campbell, Worthington, OH (US); Thomas O. Jeanes, Antioch, CA (US)

(73) Assignee: Generon IGS Inc., Malvern, PA (US)

( * ) Notice: Subject to any disclaimer, the term of this patent is extended or adjusted under 35 U.S.C. 154(b) by 0 days.

(21) Appl. No.: 09/975,753

(22) Filed: Oct. 10, 2001

(65) Prior Publication Data

US 2002/0134236 A1 Sep. 26, 2002

Related U.S. Application Data

(60) Provisional application No. 60/239,306, filed on Oct. 10, 2000.

(51) Int. Cl.[7] .................. B01D 53/22; B01D 53/047
(52) U.S. Cl. ...................... 95/45; 95/54; 95/96
(58) Field of Search .................. 95/8, 45, 54, 96

(56) References Cited

U.S. PATENT DOCUMENTS

| | | | | |
|---|---|---|---|---|
| 4,769,047 A | * | 9/1988 | Dye .................. 55/26 |
| 4,874,401 A | * | 10/1989 | Jeanes .................. 55/16 |
| 4,931,070 A | * | 6/1990 | Prasad .................. 55/16 |
| 4,955,993 A | * | 9/1990 | Sanders, Jr. et al. .......... 55/16 |
| 5,035,726 A | * | 7/1991 | Chen et al. .................. 95/54 |
| 5,035,727 A | * | 7/1991 | Chen .................. 95/45 |
| 5,084,073 A | * | 1/1992 | Prasad .................. 55/16 |
| 5,102,600 A | * | 4/1992 | Ekiner et al. .......... 264/177.15 |
| 5,205,990 A | * | 4/1993 | Lawless .................. 422/121 |
| 5,447,555 A | * | 9/1995 | Ye et al. .................. 95/54 |
| 5,470,379 A | * | 11/1995 | Garrett .................. 95/54 X |
| 5,547,494 A | * | 8/1996 | Prasad et al. .................. 95/54 |
| 5,733,435 A | * | 3/1998 | Prasad et al. .................. 95/54 X |
| 5,851,266 A | * | 12/1998 | Prasad et al. .................. 95/54 |
| 5,902,379 A | * | 5/1999 | Phillips et al. .................. 95/54 X |
| 5,944,874 A | * | 8/1999 | Prasad et al. .................. 95/54 |
| 5,954,859 A | * | 9/1999 | Keskar et al. .................. 95/54 |
| 6,139,604 A | * | 10/2000 | Gottzmann et al. .......... 95/54 |
| 6,368,491 B1 | * | 4/2002 | Cao et al. .................. 95/54 X |

* cited by examiner

*Primary Examiner*—Robert H. Spitzer
(74) *Attorney, Agent, or Firm*—William H. Eilberg

(57) ABSTRACT

A gas separation system comprising one or more ceramic membranes is described. The system, particularly, the arrangement of the ceramic membranes and/or other polymeric membranes or PSA systems, results in maximum durability of the ceramic membranes.

22 Claims, 2 Drawing Sheets

CERAMIC DEOXYGENATION HYBRID SYSTEMS FOR THE PRODUCTION OF OXYGEN AND NITROGEN GASES

CROSS-REFERENCE TO RELATED APPLICATIONS

This application is related to provisional patent application Ser. No. 60/239,306, filed Oct. 10, 2000, from which priority is claimed under 35 USC §119(e) and which application is incorporated herein by reference in its entirety.

TECHNICAL FIELD

The invention relates generally to systems using ceramic membranes in the production of free $O_2$ and/or $N_2$ gases. In particular, the present invention relates to processes for making $O_2$ and/or $N_2$ without subjecting ceramic membranes to undue stress or to reducing environments. In addition, the invention also relates to processes which use both conventional polymeric membranes or pressure swing adsorption (PSA) systems in combination with ceramic membranes (e.g., hybrid processes). The processes described herein allow for ease in purification and productivity as well as power recovery.

BACKGROUND OF THE INVENTION

Polymeric, PSA and ceramic membrane filters have all been used for separating selected gases from other gas mixtures. Polymeric membranes are described, for example, in U.S. Pat. No. 5,102,600. PSA systems are disclosed, for example, in U.S. Pat. No. 4,769,047 which discloses the use of pressure swing adsorption to remove ethylene from the purge and recycle it back to the reactor.

Membranes made from certain ceramic materials (for example Yttria doped Zirconia or Gadolinum doped Ceria) are also useful in separating gas mixtures. For example, ceramic membranes that are ionic conductors of oxygen become electrically conductive at elevated temperatures due to the mobility of oxygen ions within the crystal lattice. Since these materials are only conductive to oxygen ions in the presence of an electrical current, an external electric circuit is needed. Further, it is necessary to control the electrical current supply in order to regulate the production of oxygen required. Such an oxygen generation device comprises a membrane of such material to one side of which is supplied ambient air. Oxygen diffuses through the membrane by ionic transport and is recoverable from the other side of the membrane. Oxygen production rate is dependent on the electrical current supply to the membrane.

Although gas separation processes which make use of ceramic membranes may be more efficient than those using polymeric membranes, the ceramic membranes are typically subjected to high voltage, high temperature and high pressure conditions. U.S. Pat. No. 5,547,494 describes the use of electrically driven oxide membranes (e.g., ceramic lanthanum strontium cobaltite membranes in the production of free $O_2$). The voltage required to separate the gases increases as the concentration of the gas to be isolated decreases. U.S. Pat. No. 5,944,814 describes production of $N_2$ using an ion transport membrane under similar operating conditions. Under these harsh conditions, particularly the high voltage required, the ceramic membrane may breakdown, for example by reduction. Reduction potentials for bismuth oxide over a temperature range can be calculated from data available in the literature, for example data contained in Chatterji and Smith (1973) J. Electrochem. Soc. 120:889–893 and Turkdogan (1980) "Physical Chemistry of High Temperature Technology", Academic Press.

Thus, currently available systems have limited utility and there remains a need for improved and cost-effective systems and processes comprising ceramic membranes that are capable of operating at acceptable levels of separation productivity.

SUMMARY OF THE INVENTION

The present invention includes methods of separating a feed gas stream into elemental oxygen and nitrogen. At least two process stages are employed in which the feed gas stream is passed through at least one ceramic membrane and, optionally, at least one polymeric membrane. Unlike current methods, the present invention requires the same or lower voltage for each passage through the ceramic membrane(s), thereby greatly improving the durability of the ceramic membranes.

Thus, in one aspect, the invention includes a process for separating a feed gas stream containing elemental oxygen and nitrogen to produce purified oxygen and nitrogen gas streams. The process comprises: (a) introducing the feed gas into a first process stage comprising at least one first ceramic membrane; (b) selecting a first flux through the first process stage and providing a first voltage across the first ceramic membrane to drive an oxygen-depleted-nitrogen-enriched gas through a purity control and an oxygen-enriched-nitrogen-depleted gas into a first collection chamber; (c) introducing the oxygen-depleted-nitrogen-enriched gas from step (b) into a second process stage comprising at least one second ceramic membrane and providing a second voltage across the second ceramic membrane to drive the oxygen-depleted-nitrogen-enriched gas through a purity control and oxygen-enriched-nitrogen-depleted gas to the first collection chamber, wherein the second voltage is equal to or less than the first voltage. In certain embodiments, the second voltage is less than the first voltage, for example the second voltage is at least 10% less than the first voltage, or at least about 25%–50% less. In certain embodiments, the second process stage is one of at least two process stages successive to the first stage and each stage utilizes a voltage that is the same as or less than the voltage utilized at the preceding stage. In any of the processes described herein, the feed gas stream can be, for example, air.

In another aspect, any of the processes described herein further comprise the step of (d) driving the feed gas stream through at least one polymeric membrane or at least one PSA system prior to step (a). In certain embodiments, the pressure applied to the feed gas stream is higher in step (d) than in steps (a)–(c). In addition, any of the processes described herein can further include driving the feed gas stream through at least one pressure regulator, at least one heat exchanger and/or at least one filter before or after driving it through the ceramic membrane.

In another aspect, the invention includes a process for separating a feed gas stream containing elemental oxygen and nitrogen to produce purified oxygen and nitrogen gas streams, said process comprising: (a) driving the feed gas stream across at least one polymeric membrane or at least one PSA system and delivering a first oxygen-enriched-nitrogen-depleted gas to a first collection chamber and an oxygen-depleted-nitrogen-enriched enriched gas to a first process stage of step (b); (b) selecting a first flux to drive the oxygen-depleted-nitrogen-enriched gas of step (a) through the first process stage comprising at least one ceramic membrane and providing a first voltage across the first ceramic membrane to drive the oxygen-depleted-nitrogen-enriched gas stream through a purity control and a second oxygen-enriched-nitrogen-depleted gas stream to a second collection chamber; (c) introducing the oxygen-depleted-nitrogen-enriched gas from step (b) into a second process stage comprising at least one second ceramic membrane and providing a second voltage across the second ceramic membrane to (i) drive the oxygen-depleted-nitrogen-enriched gas stream through a purity control; (ii) drive the second oxygen-enriched-nitrogen-depleted gas stream to the second collection chamber; and (iii) drive the oxygen-depleted-nitrogen-enriched gas into a third collection chamber or outlet, wherein the second voltage is equal to or less than the first voltage and wherein the nitrogen enriched gas in the third collection chamber is at least about 99% percent pure. In certain embodiments, the second voltage is less than the first voltage, for example at least 10% smaller or at least 25%–50% smaller. In certain embodiments, the second process stage is one of at least two process stages successive to the first stage and each stage utilizes a voltage that is the same as or less than the voltage utilized at the preceding stage. In any of the processes described herein, the feed gas stream can be, for example, air. Additionally, any of the processes described herein can further comprise driving the feed gas stream through at least one additional polymeric membrane or PSA, at least one filter and/or at least one heat exchanger before or after driving it through the at least one ceramic membrane. In yet other embodiments, the pressure on the feed gas stream is reduced prior to driving it through the at least one ceramic membrane, for example using one or more pressure regulators. In certain embodiments, the pressure is below about 7 bar or below about 5 bar.

These and other embodiments of the present invention will readily occur to those of ordinary skill in the art in view of the disclosure herein.

DETAILED DESCRIPTION

Figure 1:
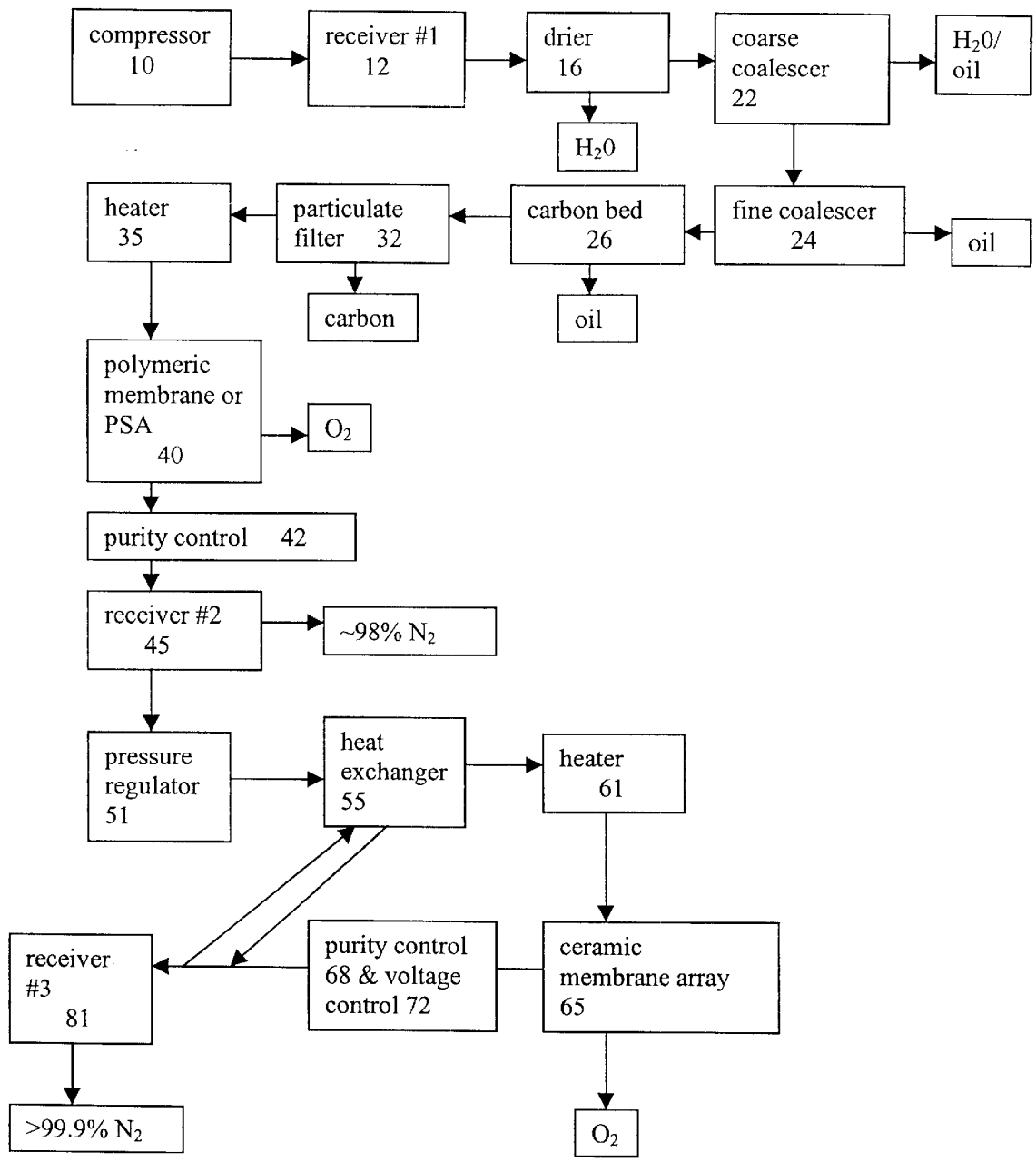
FIG. 1 is a schematic depicting an example of a ceramic membrane deoxo system according to the present invention.

The practice of the present invention will employ, unless otherwise indicated, conventional techniques of chemistry and engineering which are within the skill of the art. Such techniques are explained fully in the literature. Kesting, R. E., *Synthetic Polymeric Membranes,* John Wiley & Sons, $2^{nd}$ Ed. (1985); Hwang, Sun-Tak and Kammermeyer, Karl, *Membranes in Separation,* Robert E. Kriegar Publishing Co., Inc., (1984).

All patents, patent applications, and publications mentioned herein, whether supra or infra, are hereby incorporated by reference in their entirety.

It must be noted that, as used in this specification and the appended claims, the singular forms "a", "an", and "the" include plural referents unless the content clearly dictates otherwise. Thus, for example, reference to "a ceramic membrane" includes two or more such membranes and the like.

Although a number of compositions and methods similar or equivalent to those described herein can be used in the practice of the present invention, the preferred materials and methods are described. Therefore, it is to be understood that the terminology and examples used herein are for the purpose of describing particular embodiments of the invention only, and are not intended to be limiting.

The present invention provides a gas separation system comprising at least one ceramic membrane for separating one or more gases in a gas stream into permeate and retentate portions. The gas mixture may be a mixture of fluids in a gas, vapor, or liquid state. In addition, the systems may include one or more polymeric separation membranes or pressure swing adsorption (PSA) systems.

Advantages of the invention include but are not limited to: (1) increased durability of the ceramic membrane(s); (2) applying an operating voltage and/or temperature to the ceramic membrane as a function of the $O_2$ content in the feed stream; (3) reducing pressure operation of the ceramic membrane, independent of the upstream feed pressure; (4) reclaiming of power and/or pressure lost by lowering the pressure operation, for example using a turbo-expander; (5) allowing for customization of voltage and/or temperature conditions at each stage in a series configuration of membranes; (6) providing greater control of individual operations (e.g., ceramic membrane and polymeric membrane); (7) providing greater control of gases available for collection by allowing for the accumulation of gases in receivers between and after various stages; (8) simple and compact systems; (9) continuous operation; and (10) nearly complete deoxygenation of the feed stream.

Thus, the present invention allows for the efficient separation of gases while maintaining the durability and integrity of the ceramic membrane(s). The systems described herein contain at least one ceramic membrane. The ceramic membranes employed in the separator units are constructed of dense, ceramic oxides or mixtures of oxides, characterized by oxygen vacancies in their crystal lattice caused by defects or the introduction of dopants (such as, Y, Sr, Ba, Ca and the like), as described for example in U.S. Pat. Nos. 5,547,494 and 5,944,874. In general, temperatures of 400° C. to about 1200° C., preferably 450° C. to about 900° C., more preferably about 500° C. to about 700° C. should be maintained during operation to achieve high mobilities of the vacancies.

Large vacancy concentrations combined with high mobilities of the vacancies form the basis for rapid oxygen ion transport through the materials from which the ceramic membranes are constructed. Since oxygen ions may occupy the crystal lattice vacancies in preference to other elements, the ideal ceramic membranes possess infinite oxygen selectivity. For a description of ceramic membranes, see, for example, U.S. Pat. No. 5,205,990 and documents cited therein.

Different types of ceramic materials may be employed in a ceramic membrane separator unit keeping with the spirit of the present invention. The ceramic membrane is comprised of a material that is primarily an oxygen ion conductor (e.g., yttria-stabilized zirconia sandwiched between two porous electrodes). Electron conductivity of the electrolyte is undesirable because it leads to short-circuiting of the cell which increases power consumption. In practice, oxygen molecules diffuse through one of the porous electrodes to the electrolyte surface, at which point dissociation into oxygen ions occurs. That first porous electrode provides electrons for the process. The oxygen ions diffuse through the electrolyte and reach the second porous electrode, where recombination occurs thereby forming oxygen molecules and releasing electrons in the process. The electrons are returned to the first porous electrode for oxygen ionization by an external circuit.

As an alternative, the ceramic membrane used in this invention may be comprised of a material that conducts oxygen ions and electrons referred to as mixed conductors, so long as it is sandwiched between two layers of a primarily ionic conductor so that shorting of the cell does not occur. Porous electrodes would need to be deposited on both outer sides of the sandwich.

The thickness of the ceramic membrane should be below about 5000 microns, with below about 500 microns being preferred and below about 50 microns being more preferred. The commercially available materials used to prepare the membranes may be fabricated into thick self-supporting films or thin films supported on a porous substrate.

Ceramic membranes in the form of thin films (e.g., having a thickness within the range of from about 50 microns to about 1000 microns) are advantageously supported on porous substrates. Such porous substrates may be made either of one of the electrode materials or of another material so long as the porous electrode material is deposited between it and the electrolyte. If the film thickness is large (e.g., above about 1000 microns), the membrane may be self-supporting. The membrane may also be deployed as a flat, planar film, as a tubular member or as a self-supporting honeycomb structure (see, U.S. Pat. No. 5,205,990), with the latter being preferred.

The absolute pressures established on both sides of a ceramic membrane depend on the membrane structure as well as the particular application. Planar membrane panels, typically used in fuel cells, prefer experiencing substantially the same absolute pressure on both sides of the membrane. Tubular or other supported membranes can tolerate a higher absolute pressure on one side, such as on the anode side. Further, the pressure on the ceramic membrane is typically lower than pressures needed for polymeric or PSA-based separation systems. Generally, polymeric or PSA separation systems operate at pressures over 1 bar (90 psi). The ceramic deoxo portion of the present system preferably operates at pressures below 7 bar, more preferably at pressures between about 0 and 5 bar. Further, it will be apparent that in hybrid systems (e.g., hybrids containing both polymeric membranes and ceramic membranes), the pressure can be different as between the two components, for example by using a pressure regulator to reduce the pressure on the ceramic membranes. Such reduction in pressure aids in reducing the stress on the ceramic membranes and increasing durability of the system.

In certain embodiments, the gas separation systems may also include other types of membranes, for example, polymeric membranes, as described for example in U.S. Pat. Nos. 4,874,401 and 4,955,993. Systems containing more than one type of separation membrane are referred to as "hybrid" systems (see, e.g., FIGS. 1 and 2). The systems may also include other components, for example, those depicted in FIGS. 1 and 2.

This invention includes systems and methods for separating elemental gases from a feed gas stream to produce a permeate of enriched elemental gases (e.g., oxygen, nitrogen) and a retentate depleted of elemental gases. The term "inert" as used herein usually means oxygen-depleted gas, that is, oxygen-depleted relative to the feed gas. As discussed herein, the ion transport membrane only allows oxygen permeation. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements. The term "high purity" refers to a product stream which contains less than five percent by volume of undesired gases. Preferably the product is at least 99.0% pure, more preferably 99.9% pure, and most preferably at least 99.99% pure, where "pure" indicates an absence of undesired gases.

The mixed gas feed stream is fed into the system for one or more cycles. The system includes at least one including a solid electrolyte membrane, sometimes referred to as a "SELIC" or "ceramic" membrane, which designates a solid electrolyte ionic or mixed conductor membrane. Ceramic membranes utilized according to the present invention are capable of being electrically energized. Each ceramic membrane or membrane array separates one or more gas chambers with a retentate side in the former and a permeate side in the latter, a cathode connected to the retentate side, and an anode connected to the permeate side. Each "cycle" may also comprise many steps, for example, pressurization, blowdown, cooldown and heating, and equalization, in addition to the ion transport.

The value of the voltage is adjusted to account for additional factors such as the resistance of the electrolyte and overvoltages at the electrodes. Overvoltages, also referred to as overpotentials, describe excess voltage that must be applied to overcome non-idealities such as the kinetics of oxygen dissociation and recombination at the electrodes, diffusion of oxygen to and from each electrode and the bulk gas on that side of the membrane, interfacial resistance between the electrodes and the electrolyte, and rate limitations related to charge transfer.

According to the present invention, the feed gas is passed through a ceramic membrane array using voltage generated from an electrical source. Unlike previously described systems, the voltage is decreased or held constant at each subsequent cycle or stage. Oxygen-depleted retentate gas is passed into a receiver and permeated oxygen is withdrawn. Thus, the invention allows for the separation or purification process in stages, wherein the voltage decreases or is held constant in each successive stage relative to the preceding stage and the current, proportional to the oxygen flux, increases in each successive stage. In one embodiment, the quantity of extracted oxygen decreases by at least about 5 to about 80 percent from stage to stage (or any integer value therebetween), and voltage is held constant or decreased by at least 1 to about 50 percent per stage (or any integer therebetween). Voltages are in the range of 0.05 to 5 volts, preferably 0.3 to 2.5 volts. Actual voltages and voltage vary (e.g., decrease) from stage to stage vary according to various factors, for example, temperature, $O_2$ content in the gas, electrode overvoltages and electrolyte resistances.

As noted above, many processes using ceramic membranes are conducted under harsh conditions that cause reduction of the membrane. Reduction potentials for bismuth oxide in air and in a partial pressure of 100 ppm of oxygen are shown in Table 1:

TABLE 1

| Temp (° C.) | EMF (V)[1] in air | EMF (V)[2] in air | EMF (V)[1] in 100 ppm oxygen | EMF (V)[2] in 100 ppm oxygen |
|---|---|---|---|---|
| 400 | 0.630 | 0.558 | 0.603 | 0.531 |
| 450 | 0.608 | 0.545 | 0.579 | 0.516 |
| 500 | 0.586 | 0.531 | 0.556 | 0.501 |
| 550 | 0.564 | 0.518 | 0.532 | 0.486 |
| 600 | 0.543 | 0.505 | 0.509 | 0.471 |

[1]calculated from data obtained from Chatterji, supra.
[2]calculated from data obtained from Turkdogan, supra.

As the feed stream flows over the ceramic membrane, oxygen contained in the crude feed stock is selectively transported through the membrane. Hence, the oxygen concentration is progressively reduced as the externally applied electromotive force drives oxygen transport across the membrane. The process extracts oxygen from the gas in the chamber, which establishes a composition gradient along the surface of the electrolyte. Permeated oxygen is withdrawn from the chamber via an extraction duct and oxygen-depleted retentate gas is withdrawn from the chamber via an exit duct.

When a process according to the invention is conducted in multiple stages operated in feed series, as depicted by the system shown in FIG. 1, the voltage is preferably decreased as the $O_2$ content decreases. Thus, the voltage of the second stage is preferably less than that of the first stage, and therefore the power consumed by the second stage is low. For a high-purity, low oxygen product, the overall power required for a multi-stage process can be much less than that required for the single-stage prior art process. The voltage maximum for each stage is determined primarily based on two factors: (1) avoiding conditions which will cause reduction of the ceramic membrane; and (2) lowering power usage. As will be apparent from the teachings herein, the first stages will be more concerned with the latter (e.g., lowering power usage) while later stages will be most concerned with avoiding reduction, for example by lowering operating temperature or applied voltage.

An electrical power source is provided for energizing the cathode and the anode to drive oxygen from the feed gas through the electrolyte membrane. The power source is operated at a voltage proportional to the oxygen concentration on the retentate side of the solid electrolyte membrane. Permeated oxygen is withdrawn from the system via an extraction duct in the ceramic membrane array structure. Oxygen-depleted retentate gas passed through an exit duct which is in communication with an inlet duct into another receiver.

The temperature of operation is preferably between about 500° C. and about 650° C., and maybe even lower than 500° C. at low oxygen concentrations.

Turning to the Figures, FIG. 1 is a schematic depicting the flow of gases through an exemplary ceramic deoxo system of the present invention which includes both ceramic and polymeric membranes. Gas in a compressor 10 is fed into a first receiver 12 (e.g., any pressure vessel which can provide constant pressure during operation) and then into drier 16. Water ($H_2O$) can be collected or discarded from the drier 16. Dryers are well-known in the art and are described in U.S. Pat. Nos. 4,931,070 and 5,084,073.

The gas remaining in the drier 16 is fed into a coarse coalescer (e.g., coarse filter) 22; a fine coalescer (e.g., fine filter) 24; and then into a carbon bed 26. Coalescer filters remove aerosols and particulates for oil, dirt, etc. In particular, coarse coalescers remove particles and aerosols of microns (or even larger) while fine coalescers removed submicron particles. Oil and $H_2O$ can be collected or discarded from the coarse coalescer 22 and oil can be collected or discarded from the fine coalescer 24 and the carbon bed 26. A particulate filter 32 removes carbon, while the gas is passed to a first heater 35. The temperature of the heater is preferably between about 25° C. and about 65° C.

The gas is then fed into a polymeric membrane or PSA system 40 which separates $O_2$ from the other gases. A purity control 42 links the polymeric membrane 40 and a second receiver 45 into which the gases other than the $O_2$ are fed. Purity controls control flow and/or back pressure when coupled to one or more appropriate analyzers. Nitrogen ($N_2$) gas of between 80 and 99.5% purity can be collected from the second receiver 45, while the remaining gas mixture is fed into a heat exchanger 55, which may be preceded or followed by a pressure regulator 51. Any suitable heat exchanger can be used, for example a shell tube or extended area heat exchanger. The presence of a pressure regulator allows the operator to set a maximum gas pressure for the feed gas pressure of the ceramic membrane(s) independent of the polymeric membrane stages. Following a heating step in a second heater 61, the gas passes into a ceramic membrane array 65. Free $O_2$ can be collected from the ceramic membrane array 65 while the remaining gases are passed through a second purity control 68 and an electronic voltage control 72. Subsequently, the gases can be returned to the heat exchanger 55 or fed into a third receiver 81. Gases which are passed into the heat exchanger 55 for a second time can be then fed directly into the third receiver 81, or can pass through the ceramic membrane array 65 again. $N_2$ of high purity ($\geq 99.5\%$) can be collected from the third receiver 81.

Figure 2:
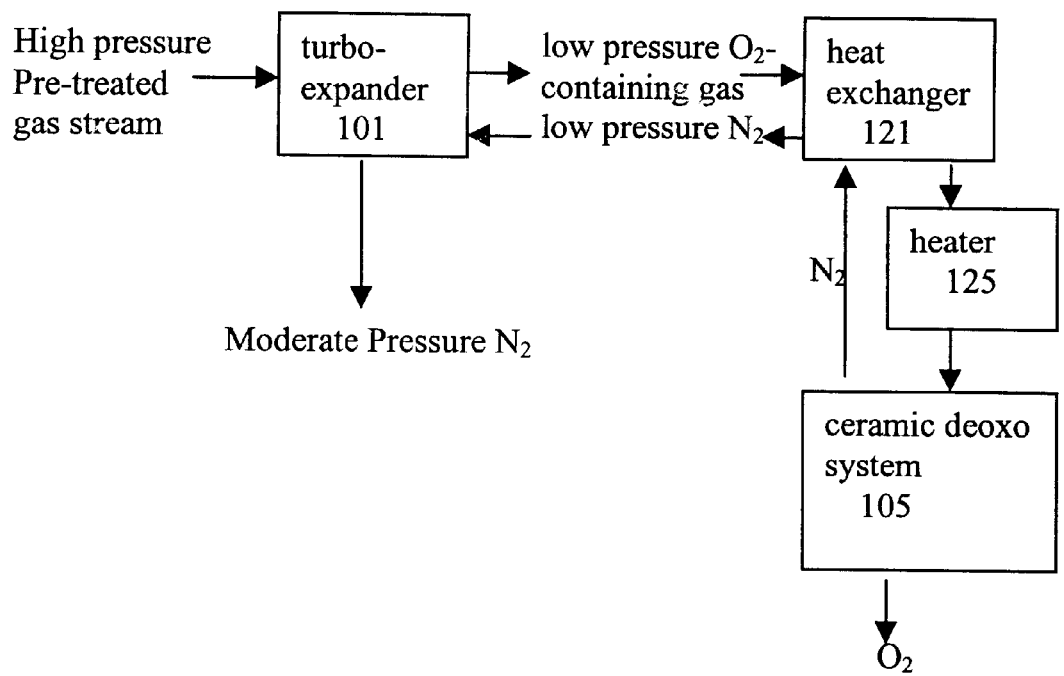
FIG. 2 is a schematic depicting another exemplary ceramic membrane deoxo system according to the present invention. The system in FIG. 2 includes a turbo-expander and heat exchanger.

FIG. 2 shows yet another embodiment of the present invention where the ceramic deoxo system 105 (e.g., as shown in FIG. 1) is connected to a turbo-expander 101, heat exchanger 121, and heater 125. The system depicted minimizes the pressure in the ceramic deoxo system 105 without typical energy loss and allows collection of $N_2$ and $O_2$ gases.

Thus, it will be apparent that the ceramic and/or polymeric membranes can be arranged in various forms such as in series or alternating configurations. In preferred embodiments, the ceramic membrane is contained in any array as illustrated in FIG. 1. In addition, in hybrid systems, the ceramic membrane(s) array is separate from any polymeric membrane component of the system.

Membranes of the invention may be homogenous, composite, symmetric, or asymmetric membranes. Preferably the polymeric membranes of the invention are asymmetric or composite while the ceramic membranes are typically metallized homogenous ceramic membranes.

Although preferred embodiments of the invention device have been described in some detail, it is understood that obvious variations can be made without departing from the spirit and scope of the invention as defined by the appended claims.

We claim:

1. A process for separating a feed gas stream containing elemental oxygen and nitrogen to produce purified oxygen and nitrogen gas streams, said process comprising:
   (a) introducing the feed gas into a first process stage comprising at least one first ceramic membrane;
   (b) selecting a first flux through the first process stage and providing a first voltage across the first ceramic membrane to drive an oxygen-depleted-nitrogen-enriched gas through a purity control and an oxygen-enriched-nitrogen-depleted gas into a first collection chamber;

(c) introducing the oxygen-depleted-nitrogen-enriched gas from step (b) into a second process stage comprising at least one second ceramic membrane and providing a second voltage across the second ceramic membrane to drive the oxygen-depleted-nitrogen-enriched gas through a purity control and oxygen-enriched-nitrogen-depleted gas to the first collection chamber, wherein the second voltage is less than the first voltage; and wherein the second process stage is one of at least two process stages successive to the first stage and wherein each stage utilizes a voltage that is less than the voltage utilized at the preceding stage, and wherein there is no process stage having a voltage which is greater than that of an immediately preceding process stage.

2. The process of claim 1, wherein the second voltage is at least ten percent smaller than the first voltage.

3. The process of claim 1, wherein the second voltage is at least 25–50% smaller than the first voltage.

4. The process of claim 1, wherein the feed gas stream is air.

5. The process of claim 1, further comprising the step of (d) driving the feed gas stream through at least one polymeric membrane or at least one PSA system prior to step (a).

6. The process of claim 5, wherein pressure applied to the feed gas stream is higher in step (d) than in steps (a)–(c).

7. The process of claim 5, further comprising driving the feed gas stream through at least one pressure regulator after step (d).

8. The process of claim 1, further comprising driving the feed gas stream through at least one filter.

9. The process of claim 1, further comprising driving the feed gas stream through at least one heat exchanger prior to driving it through the at least one ceramic membrane.

10. A process for separating a feed gas stream containing elemental oxygen and nitrogen to produce purified oxygen and nitrogen gas streams, said process comprising:

(a) driving the feed gas stream across at least one polymeric membrane or at least one PSA system and delivering a first oxygen-enriched-nitrogen-depleted gas to a first collection chamber and an oxygen-depleted-nitrogen-enriched gas to a first process stage of step (b);

(b) selecting a first flux to drive the oxygen-depleted-nitrogen-enriched gas of step (a) through the first process stage comprising at least one ceramic membrane and providing a first voltage across the first ceramic membrane to drive the oxygen-depleted-nitrogen-enriched gas stream through a purity control and a second oxygen-enriched-nitrogen-depleted gas stream to a second collection chamber;

(c) introducing the oxygen-depleted-nitrogen-enriched gas from step (b) into a second process stage comprising at least one second ceramic membrane and providing a second voltage across the second ceramic membrane to (i) drive the oxygen-depleted-nitrogen-enriched gas stream through a purity control; (ii) drive the second oxygen-enriched-nitrogen-depleted gas stream to the second collection chamber; and (iii) drive the oxygen-depleted-nitrogen-enriched gas into a third collection chamber or outlet, wherein the second voltage is less than the first voltage and wherein the nitrogen enriched gas in the third collection chamber is at least about 99% pure and wherein the second process stage is one of at least two process stages successive to the first stage and wherein each stage utilizes a voltage that is less than the voltage utilized at the preceding stage, and wherein there is no process stage having a voltage which is greater than that of an immediately preceding process stage.

11. The process of claim 10, wherein the second voltage is at least ten percent smaller than the first voltage.

12. The process of claim 10, wherein the second voltage is at least 25–50% smaller than the first voltage.

13. The process of claim 10, wherein the feed gas stream is air.

14. The process of claim 10, further comprising driving the feed gas stream through at least one additional polymeric membrane or PSA.

15. The process of 14, further comprising driving the feed gas stream through at least one filter.

16. The process of claim 14, further comprising driving the feed gas stream through at least one heat exchanger prior to driving it through the at least one ceramic membrane.

17. The process of claim 10, further comprising driving the feed gas stream through at least one filter.

18. The process of claim 10, further comprising driving the feed gas stream through at least one heat exchanger prior to driving it through the at least one ceramic membrane.

19. The process of claim 10, further comprising reducing pressure on the feed gas stream prior to driving it through the at least one ceramic membrane.

20. The process of claim 19, wherein pressure on the feed gas stream is reduced by one or more pressure regulators.

21. The process of claim 19, wherein the pressure is below about 7 bar.

22. The process of claim 19, wherein the pressure is below about 5 bar.

* * * * *